R. M. PATTILLO.
Cotton-Seed Planters.
No. 209,508.          Patented Oct. 29, 1878.
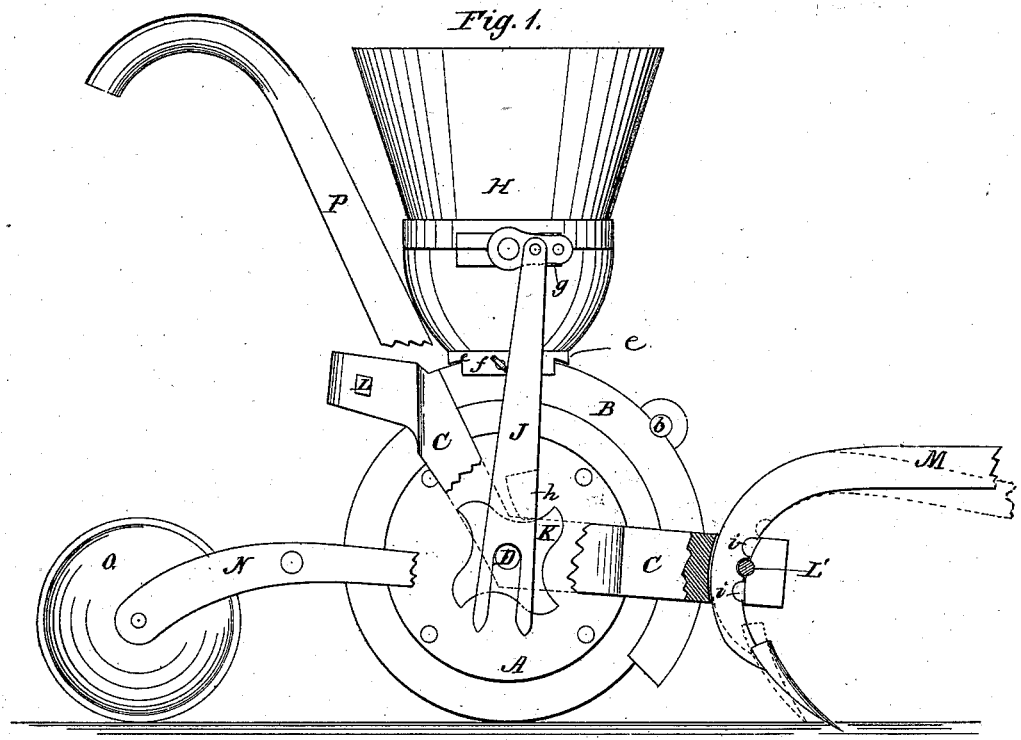
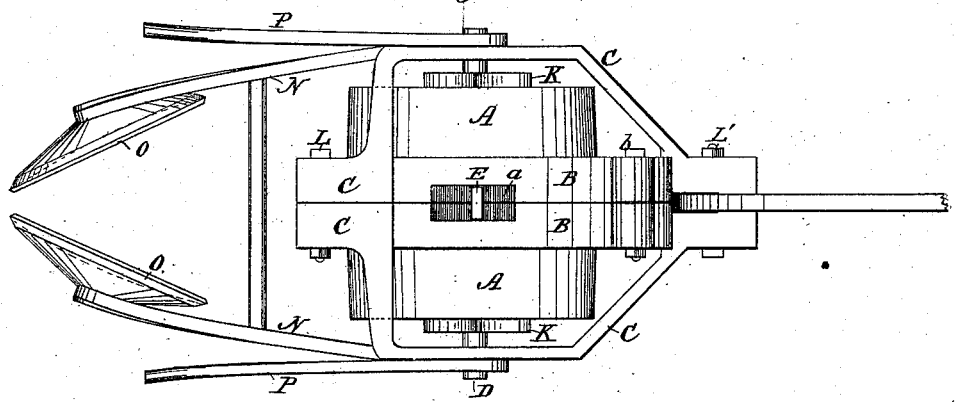
WITNESSES:
W. W. Hollingsworth
Edw. W. Byrn.
INVENTOR:
R. M. Pattillo
BY
ATTORNEYS.

R. M. PATTILLO.
Cotton-Seed Planters.
No. 209,508. Patented Oct. 29, 1878.
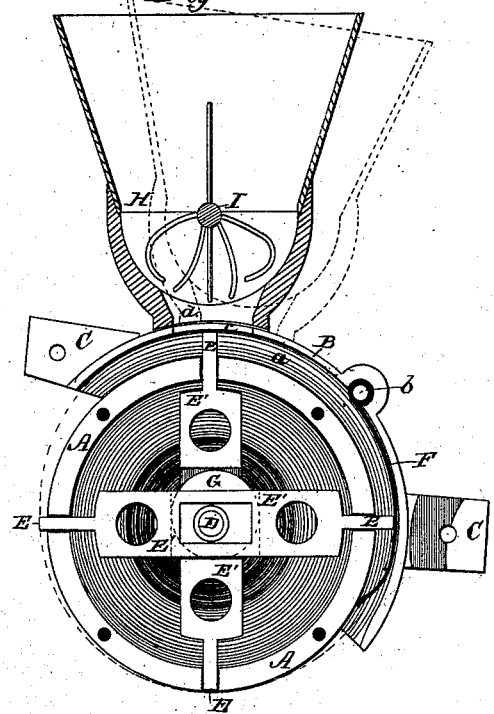
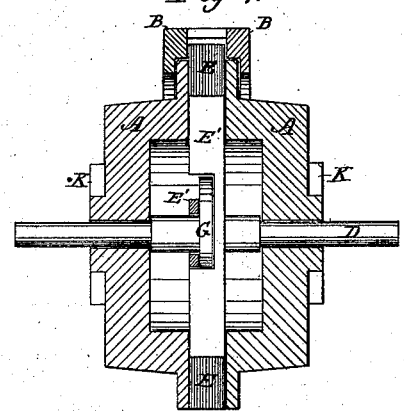
WITNESSES:
W. W. Hollingsworth
Edw. W. Byrn
INVENTOR:
R. M. Pattillo
BY
ATTORNEYS.

UNITED STATES PATENT OFFICE.

ROBERT M. PATTILLO, OF CARTERSVILLE, GEORGIA.

IMPROVEMENT IN COTTON-SEED PLANTERS.

Specification forming part of Letters Patent No. 209,508, dated October 29, 1878; application filed August 26, 1878.

*To all whom it may concern:*

Be it known that I, ROBERT M. PATTILLO, of Cartersville, in the county of Bartow and State of Georgia, have invented a new and Improved Cotton-Seed Planter; and I do hereby declare that the following is a full, clear, and exact description of the same, reference being had to the accompanying drawings, forming part of this specification, in which—

Figure 1 is a side elevation; Fig. 2, a plan view; Fig. 3, a section through the feeding devices; Fig. 4, a cross-section at right angles to the view shown in Fig. 3.

My invention relates to a novel construction of cotton-seed planter designed to plant the seed in hills.

As ordinarily practiced, cotton-seed are drilled in rows, and then after the plants have attained a certain growth the row is chopped out at intervals by a hoe or cotton-chopper, and the remaining plants left in hills or groups, which are afterward thinned. The object of my invention is to save this labor of chopping out the plants, and to obviate the difficulties heretofore experienced in planting this kind of seed, which have a tendency to clot or agglomerate by reason of the particles of lint adhering to them, thus obstructing a uniform feed.

The principal feature of the invention consists in a circular throat formed in a segmental frame, partially enveloping the periphery of a hollow disk, which throat is provided with a flat retaining-spring, and which disk, constituting also the running-wheel, is provided with radially arranged and adjustable follower-bars, the ends of which traverse the throat and form followers, so that when the seed drop from the hopper upon the surface of the disk, they pass down to the retaining-spring until the follower presses them with a clean and positive delivery past the retaining-spring, when they fall together upon the ground to constitute a hill of cotton-seed.

The invention also consists in numerous other features contributing to the excellence of the machine, which will be hereinafter more fully described.

In the drawing, A A represent the hollow disk, the upper and front portion of the periphery thereof being partially inclosed by a segmental frame, B B, formed in two sections and bolted together. The sections of this segmental frame are cast in one piece with the angular frame-sections C C, which are likewise bolted together, and in which is rigidly fastened the main axle D, upon which the hollow disk turns.

E shows the followers, which are arranged to be projected from or retracted into the hollow disk, and which serve to close transversely the throat $a$ of the segmental frame B. F is a flat spring, secured in the throat by the bolt $b$, which bolt fastens together the segmental frame-sections, and the end of which spring presses near the bottom of the throat against the periphery of the disk, so as to close the throat. The upper end of the segmental frame has an opening, $c$, leading from the hopper to the throat, and through which the cotton-seed fall into the said throat.

Now, it will be seen, as the disk is rotated by being drawn over the ground, the seed fall into the throat between the followers, and are caught and retained by the spring F until a follower forces them under the spring, which rises, thus allowing the seed to drop upon the ground to form a hill instead of a row.

In giving the desired movement to the followers for projecting them from the periphery of the disk while in the throat, and retracting them within the periphery of the disk during the lower half of the revolution, to keep them from being clogged with dirt, the followers are formed upon the ends of slotted and shouldered bars E', one upon each end, and these bars are arranged with respect to the stationary shaft D, so that the latter passes through the slots in the middle of said bars, to hold them in place, while motion is given to the bars by the cam G, located rigidly upon the shaft D, with its greatest eccentricity above the horizontal plane, so that as the shoulders of the bars E' pass around this cam the followers are projected longitudinally while in the throat, and are retracted during the lower part of their revolution.

H is the seed-hopper. This consists of a basin-shaped casting having a sheet-metal skirt or extension, in the bottom of which casting there is a slot, d, and upon each side of which slot there are lugs e e. This hopper is detachably and adjustably fastened to the segmental frame B, immediately above the opening c, by means of set-screws f, which pass through the lugs e e and bind against the sides of the segmental frame B. In adjusting this hopper about the curve of the frame B more or less of the slot d may be made to register with the opening c, so as to increase or diminish the passage for the seed.

In order to stir the seed in the hopper so as to prevent the packing or agglomeration of the same, an oscillating stirrer, I, is provided, which consists of a shaft journaled in the basin of the hopper, and provided upon the inside of the same with straight and curved fingers, to thoroughly agitate the cotton-seed and deliver them uniformly through the slot d. In giving an oscillating motion to this stirrer, cranks g are rigidly attached to the ends of the shaft outside of the hopper, and these cranks are connected to vertical bars J. These bars, of which one is employed on each side, are forked below to embrace the shaft D, so as to prevent lateral motion. To give these bars the necessary vertical movement for oscillating the stirrer, lugs h are formed upon the inside of the bars, and a wiper-wheel, K, is cast upon the side of the disk. The arms or projections of these wiper-wheels correspond to the number of followers, and as the disk revolves they strike against the lugs h of the bars J, and lift them, allowing said bars to drop down again after the wiper-section has passed by the lug h. Of these devices the set upon one side of the planter operates alternately with the set upon the other side, and the oscillating motion which is imparted to the stirrer it will be seen is a differential one, the alternate movement of the stirrer being a quick shaking movement, which facilitates the feed. To make this motion of the stirrer, however, faster or slower, the upper ends of the vertical bars J are adjusted in the holes of the crank g farther from or closer to the center, as the case may be.

In fastening together the segmental sections A and angular sections C of the frame it will be seen that a bolt, L, extending through offsets in the rear secures them at this point, while a bolt, L', passes through corresponding offsets at the front to secure them here. This latter bolt L' also serves in connection with the offsets to secure the beam by which the planter is drawn. M is this beam, which at its connection with the frame is curved downwardly and provided with several half-round seats, i.

The offsetting forward ends of the frame are recessed upon each side, so as to form when placed together a slot, which receives the curved end of the beam. This beam is then inserted into the slot, and the same bolt, L', which fastens together the sections of the frame also enters one of the half-round notches in the beam to lock it in place. The lower curved end of the beam carries the furrow-opening shovel, and the series of half-round notches are employed for adjusting the depth of this shovel. Thus the elevation of this end of the beam both raises the shovel to make it run more shallow, and at the same time depresses the front end of the beam which has an auxiliary effect in the same direction.

In constructing the hollow disk A, it will be seen that it is made in two corresponding sections bolted together, and that these sections are flanged at their edges, so that when joined together they form a circular projection, which brings the seed in the furrow.

For covering the seed in the furrow, I employ a frame, N, and hook it onto the framework of the planter. To the rear extremities of this frame are provided covering-disks O, the rear and upper edges of which disks are inclined toward each other. These disks will roll over any ordinary obstruction, and cover the seed effectually upon any kind of land, the inclination of the disks serving to throw the dirt upon the seed and close up the furrow.

In attaching the handles P, they encompass the main axle D at their lower ends, and are bolted to the angular frame C, so as to be adjusted about the axle as a center to raise or lower the handles. The rear portion of the angular frame C also is provided with an edge, which rests upon the periphery of the revolving disk and scrapes off the dirt.

With respect to the subject-matter of the second claim, I do not claim, broadly, a hollow disk with radial plungers arranged to be projected, but only the shouldered and slotted connection of the same with the shaft and cam.

Having thus described my invention, what I claim as new is—

1. A cotton-seed planter consisting, essentially, of a curved throat with retaining-spring, and a rotating disk having extensible followers fitting in said throat, combined and arranged substantially as herein described.

2. The hollow disk A A, made in two sections, in combination with the rigid shaft D, having cam G, and the slotted and shouldered follower-bars E', substantially as shown and described.

3. The combination, with the segmental frame B, having opening c, of the hopper H, having a slot, d, and made adjustable on the curve of the segmental frame, to regulate the size of the feed-passage, substantially as described.

4. The combination, with the stirrer having cranks g, of the disk having wiper-wheels K, and the vertical bars J, having lugs h, and made forked or slotted, so as to embrace the axle, substantially as and for the purpose described.

5. The combination of the angular frame-pieces C C, having recessed offsets to form a vertical slot, the curved and notched beam M, having bolt-seats $i$, and extended down past this point to form the standard for the shovel, together with the fastening-bolt L', arranged to secure the frame-sections and lock the beam, substantially as herein described.

The above specification of my invention signed by me this 22d day of August, 1878.

ROBERT M. PATTILLO.

Witnesses.
   EDWD. W. BYRN,
   SOLON C. KEMON.